Dec. 9, 1958     W. B. REED ET AL     2,863,953
TRANSDUCER
Filed July 30, 1956     3 Sheets-Sheet 1

INVENTORS
WILBUR B. REED
HENRY E. JOHNSTON
BY
Carl H. Synnestvedt
AGENT

Dec. 9, 1958    W. B. REED ET AL    2,863,953
TRANSDUCER
Filed July 30, 1956    3 Sheets-Sheet 3
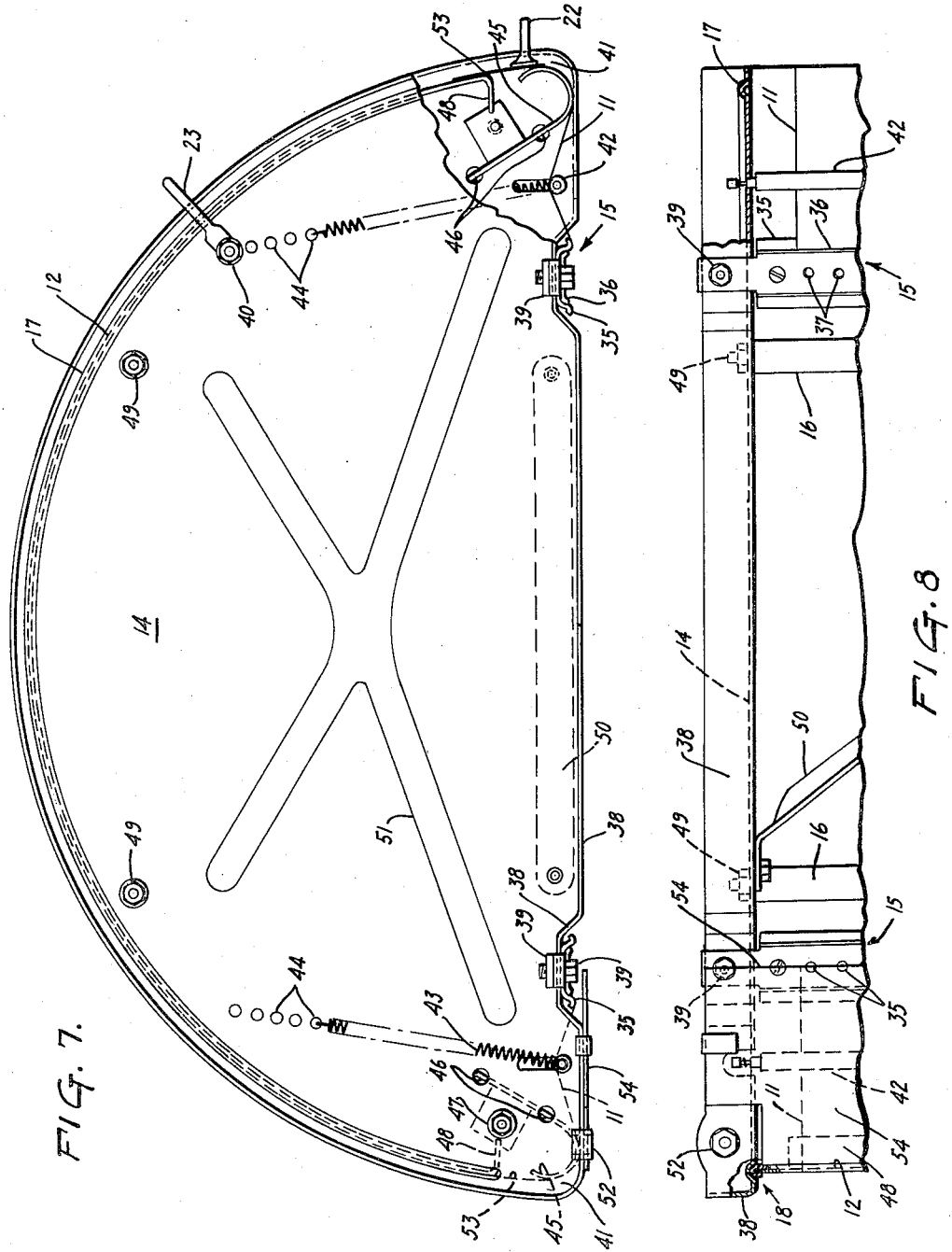
INVENTORS
WILBUR B. REED
HENRY E. JOHNSTON
BY
Carl H. Synnestvedt
AGENT United States Patent Office 2,863,953
Patented Dec. 9, 1958

2,863,953

TRANSDUCER

Wilbur B. Reed, Havertown, and Henry E. Johnston, Philadelphia, Pa., assignors to Philco Corporation, Philadelphia, Pa., a corporation of Pennsylvania Application July 30, 1956, Serial No. 600,896

11 Claims. (Cl. 179—111)

This invention relates to electro-acoustical transducers and particularly to electrostatic loud-speakers. It is an improvement over the invention of Lloyd J. Bobb disclosed in the copending application Serial No. 425,607, filed on April 26, 1954, and assigned to the assignee of the present invention.

In accordance with the Bobb invention referred to, and in many other previous constructions, electrostatic forces were used only for generating sound of high audible frequency, for instance, upwardly from 7,000 cycles per second. In this high range of frequencies the electrostatic speaker principle could be used to best advantage, whereas middle and lower frequencies were usually covered by a dynamic speaker or by a system of dynamic speakers, the latter mainly when high fidelity was required.

On the other hand there are several known advantages in constructing and using an electrostatic loud-speaker for generating not only the higher tones and overtones but also other sound, down to the low frequencies or at least down to the medium frequencies, such as 2,000 cycles. Basically, this requires the use of a relatively large membrane area; and this, in turn, has heretofore caused problems in the construction and maintenance of the speakers.

It is therefore an important object of our invention to provide a simplified but efficient and reliable electrostatic speaker, covering middle as well as upper portions of the audible range.

It was found to be particularly desirable, for truly excellent performance, to insure high sensitivity and low internal noise, by the use of a large sound radiating membrane which is uniformly thin and uniformly, closely adjacent to a support plate, in conjunction with such electrical connecting and mechanical mounting features for these parts as are capable of maintaining a practically uniform electrostatic field and equally uniform mechanical tension throughout the vibrating membrane area; and it is a particular object of our invention to provide such features of construction and operation.

For these latter purposes we have provided a novel arrangement, particularly characterized by certain seemingly simple and inconspicuous holding and insulating means, installed between the membrane support plate and the structural support thereof. In a preferred form of our invention, a single support plate is used, which plate is semi-cylindrical; and the support structure for this plate includes a system of metallic end plates or plate-like members, while the support for the membrane includes a system of metallic bars or bar-like members supported by said end plates and adapted to maintain intimate mechanical and electrical connection with an extended part of the membrane. The end plates cooperate in maintaining direct, strong, permanently uniform, mechanical connection with the membrane support plate, while providing electrical insulation therefrom, by means of newly formed or newly arranged insulating members as mentioned. These insulating members are preferably formed as a pair of narrow channels of synthetic plastic material, installed between the curved plate and the end plates and extending along the curved edges of these plates.

The details of these arrangements and the way in which acoustical advantages as well as manufacturing and servicing advantages are obtained thereby will be understood more readily from a consideration of the following, detailed description, taken together with the accompanying drawing which illustrates a preferred embodiment of our invention.

In the drawing:

Figure 7 is a top view of the apparatus of Figure 1, on a scale intermediate those of Figures 1 and 3; and Figure 8 is a fragmentary front elevation of said apparatus, on a scale similar to that of Figure 7.

Figure 1:
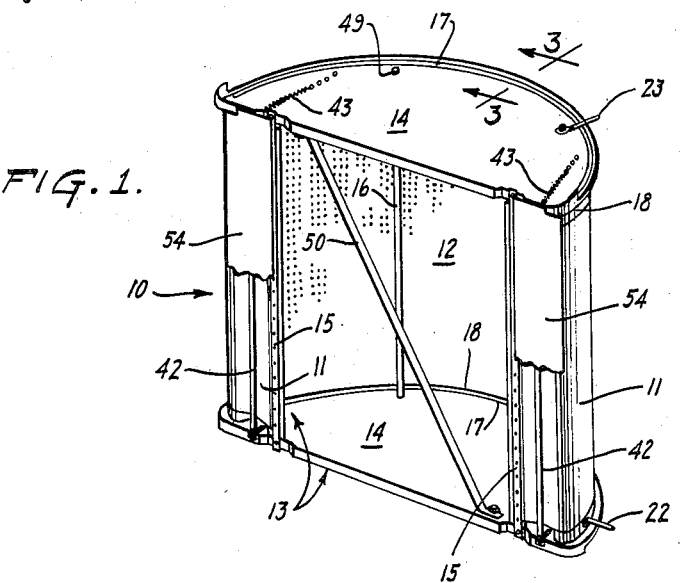
Figure 1 is a perspective view of an electrostatic loudspeaker constructed in accordance with our invention.
Figure 2:
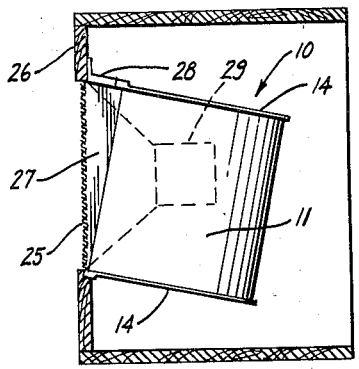
Figure 2 is drawn on a smaller scale and shows a cabinet having the new loud-speaker and other acoustical equipment mounted therein.

Referring first to Figure 1: the basic parts of the electrostatic speaker 10 include membrane 11, support plate 12 and holding structure 13. The membrane 11 is an extremely thin, flexible and imperforate element, while the plate 12 is a fairly thin, more rigid, formaminous metal sheet, having the membrane tensioned over its surface which is vertically arranged and arcuately curved into semi-cylindrical form. The holding structure 13 comprises, as principal elements, a pair of horizontal, desirably metallic top and bottom members or end plates 14 for holding the plate 12; a pair of vertical, desirably metallic bars 15 for clamping opposite edges of the membrane 11, and a system of vertical posts 16, for spacing the top and bottom members 14 apart and mounting them to form a rigid structure with plate 12. The parts which are herein described as vertical or horizontal may be slightly inclined from said respective positions, as shown in Figure 2.

In order to effectively provide an extended range of operating frequencies, reaching for instance from the upper limit of audible sound, adjacent 20,000 cycles, down to the region of 2,000 cycles—that is, in order to provide sufficient air coupling in the lower part of such a range—the electrostatic speaker membrane 11 must cover an area of several hundred square inches. This, in turn, gives rise to problems of mechanical and electrical nature, as initially mentioned; but we have discovered that such problems can be solved by means of a simple combination of features, which will now be described.

Figure 3:
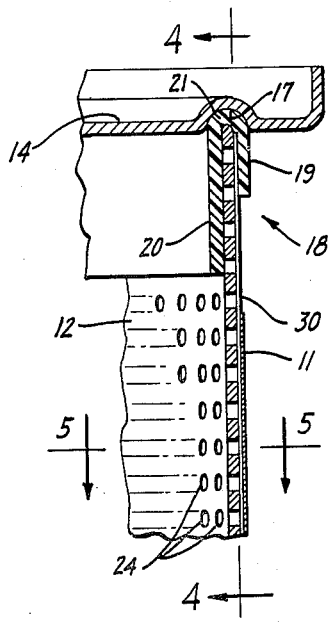
Figure 3 is a considerably enlarged detail section, taken along line 3—3 in Figure 1.

In order to support the membrane supporting plate 12 against the bending forces imposed thereon by the tensioning of the membrane, Figure 1 shows the curved upper and lower edges of this plate 12, as effectively retained in approximately semi-circular grooves 17, formed in peripheral parts of the end plates 14; however, the plates 12 and 14 are electrically insulated from one another by insulator strips 18, effectively clamped between these plates by the posts 16 and associated fasteners. As best shown in Figure 3, each insulating strip 18 may have the form of a narrow channel, having outer and inner walls 19, 20, spaced to accommodate the thickness of the plate 12 and connected by a curved portion 21. The strips or channels 18 extend in an arcuate course along the edges of the plate 12, with the curved portions 21 lying in the matching grooves 17.

Suitable electrostatic voltage differentials can be provided between the vibratory membrane 11 and the stationary plate 12 by the use of two terminals: a terminal 22 secured to the plate 12, see Figure 1, which terminal is supplied with suitable polarizing and signal voltages by a phonograph or radio amplifier or the like (not shown); and a terminal 23 for the membrane 11, this terminal being electrically coupled to one of the end plates 14 and thereby to both of the membrane-clamping bars 15 and being grounded or kept at the potential of a suitable chassis, such as that of the phonograph or radio apparatus.

In the preferred arrangement of the speaker, as illustrated in Figure 2, the membrane 11 covers a back surface of the speaker 10. Accordingly the present membrane-supporting plate 12 will and should generally be considered as a front plate, not as a backing member as the membrane supports of prior electrostatic speakers; this plate being disposed in front of the vibrating membrane 11 and the emitted sound being heard through a system of small apertures 24 in this plate. Thereafter the sound may pass through the usual fabric cover 25, extending across a large aperture in the front panel 26 of a cabinet, while the space between this panel and the tilted speaker front may be closed by side and top members 27, 28. The cabinet may further be equipped with a single dynamic speaker or woofer 29 to cover the frequency range below 2,000 cycles.

Figure 4:
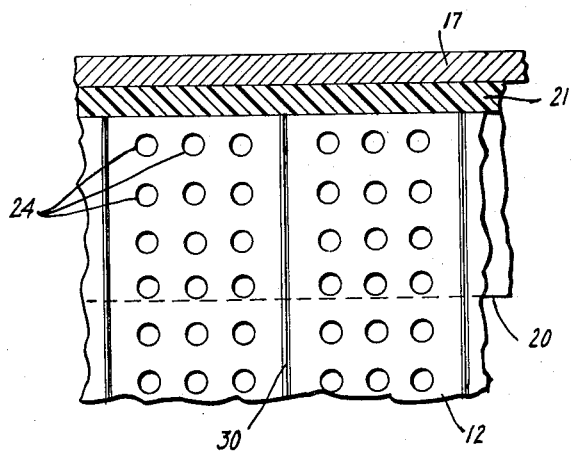
Figure 4 is a more enlarged section, taken along line 4—4 in Figure 3.
Figure 5:
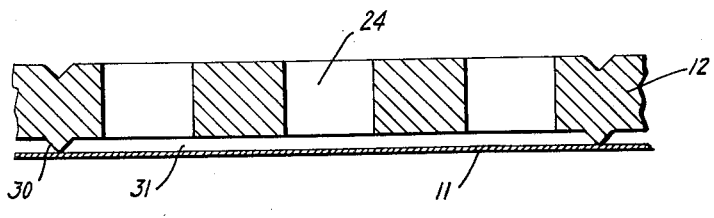
Figure 5 is a further enlarged detail section, taken along line 5—5 in Figure 3.

Referring next to the details of Figures 4 and 5: the perforations 24 in the front plate 12 desirably have the form of small, regularly distributed, circular holes, covering jointly at least about thirty percent of the total area of the plate and having diameters longer than their axial length. Between suitable rows of such openings, there are provided membrane contacting and spacing means, shown as integral ridges or so-called pips 30, running vertically over the convex or back surface of the plate 12 and projecting therefrom by a small distance as compared with the diameter of a hole 24. Desirably, parallel ridges 30 are spaced apart at close distances from one another, for instance as shown with three parallel rows of apertures 24 therebetween, the spaces between any two adjacent ribs 30 being approximately one-quarter inch wide. Thus there are formed extremely shallow air spaces 31 between the plate 12 and the membrane 11; the average depth of each air space being desirably of the order of about two or three mils, at most, in order to insure a high degree of sensitivity in the electrostatic operation of the speaker.

Figure 6:
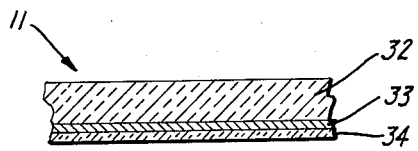
Figure 6 is a still more enlarged detail from Figure 5.

The membrane itself should add as little as possible to this spacing and should also have very little mass; it is therefore made of an extremely thin film 32 (Figure 6), which may for example have only about one mil thickness. Such a film, which nevertheless is strong enough to allow tensioning and vibration, may be made for instance from the material known as "du Pont Mylar Polyester Film," which is manufactured by E. I. du Pont de Nemours & Co. and supplied by Minnesota Mining and Manufacturing Co. The outside or back side of the film carries a metallic covering 33 of even greater thinness, such as a small fraction of a mil; and the other side of the metal layer 33 may have a thin protective coating 34 thereon, formed for instance by a suitable varnish.

The exact, preferred manner in which electrical contact is made with the thin and widely extending membrane-covering material 33 and in which tensioning forces are applied to the equally wide membrane film 32, according to the present invention, can best be described in connection with Figures 7 and 8, together with Figure 1.

As shown in Figures 7 and 8, each connector bar 15, installed adjacent to and parallel to the straight, terminal edges of the semi-cylindrical speaker structure, is arranged to rigidly anchor terminal, vertical edges of the membrane 11 to the horizontal top and bottom plates 14 and at the same time to make electrical contact with the conductive layer 33 (Figure 6) of the membrane 11. In order to insure intimate and uniformly distributed metal-to-metal contact, through the overlying film 32 and/or coating 34, each connector bar 15 comprises a pair of parallel bar elements 35, 36 clamping a straight edge portion of membrane 11 therebetween (Figures 7, 8); each bar element 35 has a series of apertures 37, penetrating the same and uniformly, closely spaced from one another along the entire bar, and a suitable, conductive, film and varnish dissolving and adhesive medium may fill these apertures and contact adjacent metal portions of the bar 15 and layer 33. As mentioned in said copending application, such a medium may be provided by a solvent-base metal paint.

Each bar element 35, 36 is shown in Figures 7 and 8 as having the form of a generally flat strip, reinforced by crimped edges. Each end portion of such a strip may be folded over a vertical flange 38, forming part of one of the rigid top and bottom plates 14; and the folded over end portions may be clamped onto the flange 38 by suitable fasteners 39. A similar connecting device, as generally indicated by numeral 40, may be used to connect the membrane terminal 23 with one of the rigid holder plates 14.

The membrane 11, when connected to the speaker structure only by the bars 15, has a certain amount of slack; and this slack is taken up by connecting means in addition to those described up to this point. Between each clamping and connecting bar 15 and the adjacent vertical front edge portions 41 of the top and bottom plates 14 there is provided a vertical, membrane-tensioning bar 42 which is movably connected with the other rigid structure by a pair of extension springs 43; said springs extending on and along the plates 14 and being adjustably anchored into the same as shown at 44. The tensioning bars 42 have circular cross-section and are in contact with vertical membrane portions. It is a matter of choice whether the latter membrane portions have a coating of metal 33 and whether they have a protective layer 34, but they must comprise integral portions of the strong, thin film 32. Preferably, as best illustrated in Figure 7, the bars 42 are arranged so as to urge the membrane slightly into the space defined by the semi-cylindrical structure. By such tensioning, uniform electrostatic fields are provided and maintained in the air spaces 31 (Figure 5) throughout the active area of the present membrane, in substantially the same way as in said copending application.

The connector structure is completed by a system of rigid posts, combining the plates 12 and 14—in conjunction with the interposed insulator strips 18—into a rigid framework. These members comprise a pair of corner posts 45, vertically extending between the end plates 14 adjacent their corners 41 and anchored to these plates 14 (Figure 7) by suitable lock and bolt means 46, 47. No attempt need be made to electrically insulate those parts from one another. On the other hand the end portions 48 of the membrane support plate 12—which we prefer to bend inwardly in order to avoid injury to the membrane by any sharp edges—are electrically insulated from the holder structure by the dielectric channel members 18. The rigid post structure may further comprise fasteners 49 for the vertical posts 16 and one or several diagonal braces 50, as well as suitable reinforcements 51 of the plates 14. Insofar as the posts or braces 16, 50, etc. are located in the close vicinity of the membrane support plate 12, they are desirably made very rigid and formed with smoothly rounded surfaces in order to minimize undesirable acoustical reflexes, shadow effects and the like, as is known to the art; and the corner posts 45 are similarly rounded, also in order to avoid excessive stressing of the membrane, which turns about these posts from semi-circular form into a form approximately parallel to the straight front edges. Mounting means 52 (Figures 7, 8) may be provided in or on the flanges 38 of the end plates 14, in order to mount the loud-speaker on the cabinet panel 26 or top member 28 (Figure 2).

The electrical and mechanical holders and connectors as herein described have been found to be able to maintain, throughout the large, curved, acoustically active area of the speaker, such electrostatic and vibratory conditions as are conducive to a most desirable, unusually flat and sensitive frequency response over a wide frequency range, for instance over a range from 2,000 to 20,000 cycles; and broad diffusion of sound is obtained throughout this range.

It has been found that further improvement is possible as to the flatness of frequency response by limiting the acoustically active area to a part of the membrane and its support, which part does not include the area in the immediate vicinity of the membrane connectors. Close observation has shown that some little deterioration of the sound response tends to occur, probably due to acoustical radiations and reflections, in the region of the necessarily strong and large corner posts 45; also by possible resonance effects or even by a rattle which may be picked up from various external sources in the wide, inherently reflective membrane portions on both sides of the tension bars 42. These effects can be counteracted very simply by interposing a vertical dielectric padding strip 53 (Figure 7) of polyester plastic or the like, a few mils thick, between the membrane 11 and plate 12 in the direct vicinity of each corner post 45, and by further interposing a vertical acoustically absorbent strip 54 of tar paper or the like between the tension bar area and the cabinet front panel, particularly when this panel is spaced from said area due to a tilted installation of the speaker (Figure 2).

Throughout the operation of the present speaker the membrane 11 is tensioned with practically uniform force, by means of the resilient tensioning apparatus as described. If the temperature rises or drops, there may occur corresponding, differential expansions or contractions of the membrane and of its support system. In response to such differential expansion or contraction, there occurs an automatic shortening or lengthening of the springs 43, whereby the predetermined tension of the smoothly arranged membrane is maintained, substantially as in said copending application.

By means of the terminals 22, 23 a biasing voltage, such for instance as 300 volts, is maintained between the membrane 11 and the plate 12; and all membrane sections between ridges 30, Figure 5, are thereby held under an extremely slight and practically uniform curvature relative to the plate 12. Through the same terminals an undulating signal voltage, such for instance as 100 volts, is impressed on the electrostatic field, at audio frequencies, whereby said curvature of the membrane is significantly changed in audio cycles, leading to the radiation of sounds of corresponding frequency, through the apertures 24.

For the efficient, sensitive performance of this electrostatic vibrating operation the changing signal voltages must be distributed over the large membrane with uniformity, as by the clamping bars 15, and without disturbance of the uniform and precise geometry of membrane and support plate arrangement. All partial areas of the membrane and support plate, one of which is shown in Figure 5, must be kept uniform as to electrostatic field and mechanical tension conditions, without objectionable disturbance by local wrinkles or the like. This was heretofore difficult, in a large and wide-range speaker; and among the reasons for the difficulty we found several to be particularly serious, which had to do with the provision and maintenance of proper electrical insulation between the membrane apparatus (including holders and connectors) and the support plate apparatus (again including holders and connectors). Various possible arrangements and forms of insulators have been tried and compared and by far the best overall results have been obtained by the narrow, curved, horizontal insulator members 18 along the horizontal plate edges (Figure 3).

By means of these members the desirable operating characteristics of the new speaker, as described, can be obtained with safety; our design avoids such complications as have previously arisen from manufacturing difficulties affecting membrane connectors, backing plate holders, and the like. In addition, the effective characteristics of the new speaker can be maintained throughout an extended period of use; particularly with the help of the feature that a metallic holder structure, provided by the reinforced end plates 14 and posts 45, etc., is electrically insulated from but mechanically integrated with the curved, metallic plate structure 12, by means of narrow insulator strips or channels 18 (Figure 3). The narrow and elongated form of these strips or channels eliminates any distortion of the support plate, relative to the membrane; and any consequent non-uniformity of electrostatic field and acoustical performance, in the various active parts of the system of vibrator chambers 31 (Figure 5).

While only a single embodiment of the invention has been described, it should be understood that the details thereof are not to be construed as limitative of the invention, except insofar as set forth in the following claims.

We claim:

1. An electrostatic loud-speaker comprising: a pair of metallic support plates of generally segmental shape; a metallic foraminous plate of arcuate shape, coaxial with the support plates; means for mechanically interconnecting said plates to form a substantially rigid and distortion-resisting structure; a thin membrane overlying the foraminous plate and very slightly spaced therefrom; and electro-mechanical connector means extending along the ends of the foraminous plate and adapted to maintain uniform electrical potential and uniformly tensioned form throughout the membrane.

2. A loud-speaker as described in claim 1, comprising, as part of the means for mechanically interconnecting the plates, electrical insulator means disposed along the arcuate edges of the foraminous plate and interposed between the same and the support plates.

3. A loud-speaker as described in claim 2 wherein the insulator means comprises a pair of channel members of dielectric material, folded over the arcuate edges of the foraminous plate.

4. A loud-speaker as described in claim 1 wherein the connector means comprises a pair of metallic holder and connector bars, each adapted to apply substantially distributed clamping forces and direct electrical coupling to an extended edge of the membrane.

5. A loud-speaker as described in claim 4 wherein the membrane has electrically conductive and non-conductive layers, each connector bar has a series of closely spaced apertures, and such apertures have a material therein for dissolving adjacent parts of a non-conductive layer and for electrically coupling the conductive layer with the bar.

6. An electrostatic loud-speaker comprising: a pair of support members of generally segmental shape approximating the shape of a half circle, said members being rigidly and coaxially interconnected; a metallic foraminous, bent plate coaxially held and electrically insulated by the support members; a vibratory, electrically conductive membrane disposed about the bent plate with narrow air spaces between the membrane and the plate; and a membrane holding, connecting and tensioning structure secured to each pair of axially aligned corners of the support members for mechanically tensioning the membrane over the bent plate and impressing predetermined potentials upon the membrane.

7. An electrostatic loud-speaker as described in claim 6, wherein said structure comprises a rounded bar-like member around which the membrane is turned and tensioned; and a second bar-like member slightly spaced from the first-mentioned one and adapted to resiliently tension the membrane.

8. An electrostatic loud-speaker as described in claim 7, additionally comprising means for substantially preventing vibration of a portion of the vibratory membrane overlying the bent plate, adjacent said bar-like members.

9. An electrostatic loud-speaker as described in claim 7, additionally comprising means for absorbing any vibrations which may occur in the membrane adjacent said bar-like members.

10. An electrostatic loud-speaker comprising: a metallic, foraminous back plate structure of predetermined arcuately bent form; a thin membrane supported by said back plate structure, in tensioned condition, so as to apply reaction forces to said structure; rigid, metallic support means for said back plate structure; narrow, elongated, electrical insulator strip means, interposed between said backplate structure and said support means and extending along and adjacent edge portions of the back plate structure which follow said predetermined, arcuately bent form; a retaining structure forming part of the support means and extending along and adjacent the insulator strip means for keeping the same and thereby said edge portions and back plate structure in said predetermined, arcuately bent form, against said reaction forces; and membrane connector means extending along straight end portions of the arcuately bent back plate structure for maintaining uniform electrical potentials throughout the membrane.

11. A loud-speaker as described in claim 10, the back plate support means of which comprises a pair of substantially flat, segmental, rigid metal plates, each extending at right angles to the back plate structure and each having an arcuate groove therein to provide said retaining structure.

References Cited in the file of this patent

UNITED STATES PATENTS

| | | |
|---|---|---|
| 1,782,278 | Vogt | Nov. 18, 1930 |
| 1,789,554 | Kyle | Jan. 20, 1931 |